J. W. WHITE.
COMBINED BRAKE MECHANISM AND SPRING SUPPORT FOR MOTOR VEHICLES.
APPLICATION FILED JULY 31, 1919.
1,431,132. Patented Oct. 3, 1922.
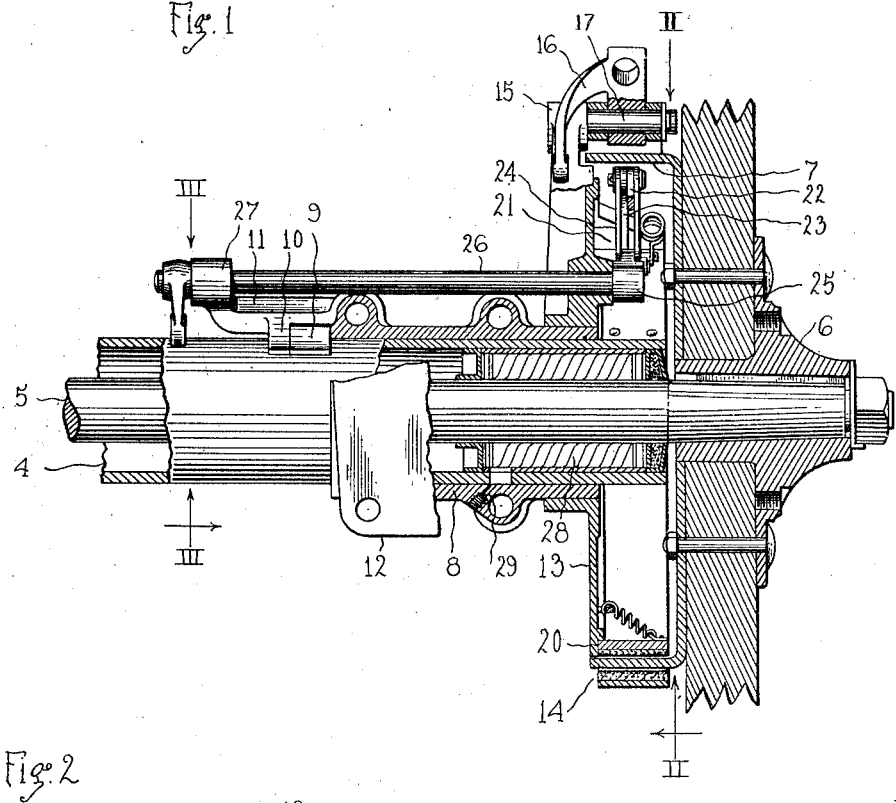
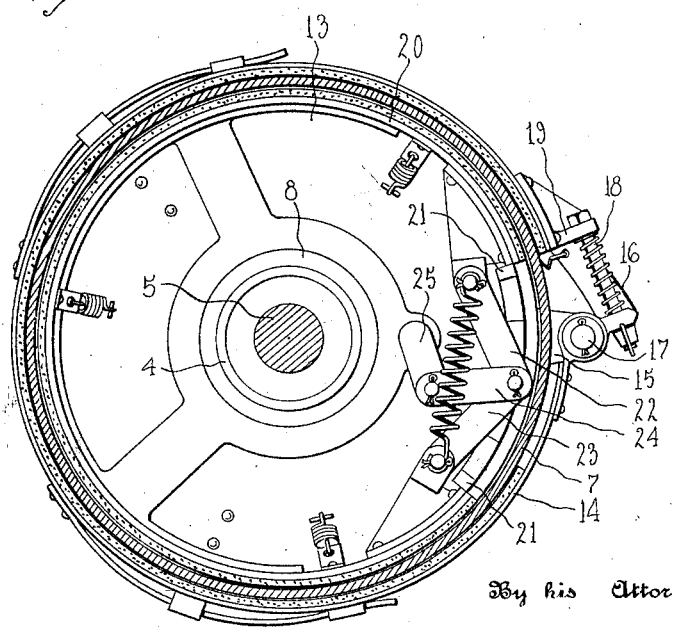
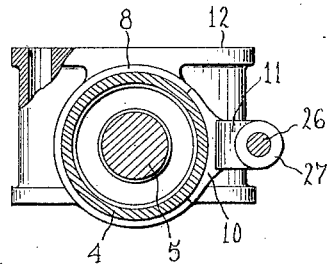
Inventor
John W. White
By his Attorney Lloyd Blackmore.

Patented Oct. 3, 1922.

1,431,132

UNITED STATES PATENT OFFICE.

JOHN W. WHITE, OF DETROIT, MICHIGAN, ASSIGNOR TO GENERAL MOTORS CORPORATION, OF DETROIT, MICHIGAN, A CORPORATION OF DELAWARE.

COMBINED BRAKE MECHANISM AND SPRING SUPPORT FOR MOTOR VEHICLES.

Application filed July 31, 1919. Serial No. 314,459.

*To all whom it may concern:*

Be it known that I, JOHN W. WHITE, a citizen of the United States, and resident of Detroit, Wayne County, State of Michigan, have invented certain new and useful improvements in Combined Brake Mechanism and Spring Supports for Motor Vehicles, of which the following is a specification.

My invention relates to brake mechanism designed for use with automobiles, motor trucks, and similar self-propelled vehicles, and particularly to brake mechanism of the general class or type wherein the retarding action is produced by forcing a brake band or equivalent element which is restrained from partaking of the rotary motion of a wheel of the vehicle into engagement with a brake drum secured to and rotating with the wheel.

The principal object of my invention is to provide brake mechanism of the class or type above referred to and wherein the stresses due to the application of the brake to the brake drum will be transmitted through the springs of the vehicle directly to the frame thereof, as distinguished from transmitted to the rear axle housing and from said housing to the vehicle frame, ordinarily through the transmission and change speed gear casing of the vehicle.

A further object of my invention is to provide various improvements in and relating to brake mechanism wherein the strains due to the braking action are transmitted directly to and resisted by the frame of the vehicle, all as will hereinafter and at length appear.

My invention is illustrated in its preferred form in the drawing accompanying and forming a part of this specification; although it will be appreciated that various changes, modifications, and variations may be made in the particular embodiment thereof illustrated without departing from the spirit of my invention, and that my invention includes all such changes in the particular embodiment thereof illustrated as come within the scope of the claims at the end of this specification and wherein the particular features in which my invention consists are enumerated.

Referring to the drawing:

Figure 1 is a view showing my invention for the most part in plan, although certain portions which would otherwise appear in this view are broken away in order to better illustrate the same;

Figure 2 is a view showing a section of my invention taken upon a vertical plane transverse to the axle of the vehicle and indicated by the line II, II of Figure 1; and, Figure 3 is a view showing a section upon a transverse plane indicated by the line III, III of Figure 1.

Referring to the drawing, the reference numeral 4 designates one end of a tube or housing of the rear axle of a motor vehicle, and 5 designates one of the drive shafts which extend therethrough; there being two such shafts or axles one extending each way from a central differential gearing through which both the shafts are driven, as will be appreciated. These rear axles serve to drive the wheels of the vehicle through hubs, one of which is indicated by the reference numeral 6; and the wheels are provided each with a brake drum 7. It will be appreciated that the elements thus far described are elements common in motor vehicles, and that my invention is in no way concerned with the specific form of the said elements; which form will be varied in various ways in different vehicles according to the choice of the designer, or with reference to the particular service for which the vehicle is required.

Surrounding the outer end of the housing tube 4 is a sleeve or barrel 8 which is loose upon the housing tube so that it may be rotated thereupon to effect its removal from the barrel, or to permit slight relative angular movements between the barrel and the tube; but which barrel is held upon the tube and prevented from moving longitudinally thereof by a key member 9 secured to the tube and adapted to lie between the end of the barrel and a depending flange 10 formed upon an arm 11 extending from the said barrel in the embodiment of my invention illustrated.

The barrel 8 serves as a support for a spring pad 12 to which one of the springs whereby the frame or body of the vehicle is supported is secured, and whereby the said spring is supported.

The barrel 8 is also provided with a projecting flange or disc 13, which is welded, riveted, or otherwise fixedly secured to said barrel, and which flange serves as a support for the brake band, brake shoe or other element or elements designed to cooperate with the brake drum 7 to retard the motion of the vehicle, as well also as a support for the brake applying mechanism through which the said retarding elements are operated to accomplish the braking action in the form of my invention herein described.

In the form of my invention shown the braking mechanism includes an external brake band 14 one end of which is secured to an arm 15 with which the support or flange 13 is provided, and the free end of which band is drawn into contact with the exterior of the brake drum by means of a rocking brake applying lever 16 pivotally supported from the arm 15 by a stud 17, and which lever is operatively connected with the free end of the brake band through a bolt 18 extending through holes provided in the lever 16 and in a bracket 19 secured to the free end of the brake band.

The brake mechanism above described is in the nature of an emergency brake, the ordinary braking action being accomplished by means of an internal brake band 20 extending throughout the greater part of the inner periphery of the brake drum, and the free ends of which abut against stops 21 to prevent rotation of the said band. The said free ends are forced apart by means of toggle levers 22, 23 which in turn are operated to straighten them by means of a link 24 operatively connected with an arm 25 upon the outer end of an oscillating brake applying shaft 26 having a bearing in the flange 13, and the remote inner end of which is supported in a bearing in an arm 27 carried by the arm 11 above referred to.

It will be appreciated, however, that the specific brake mechanism above described is for the purposce of illustrating my invention, and that other types of braking elements such, for example, as brake shoes, may be used; the elements in question being supported from the barrel 8 so that when they are forced into engagement with the brake drum the resulting stresses due to the retardation of the motion of the vehicle will be transmitted through the flange 13 to the barrel and spring supporting pad, and therefrom to the frame of the vehicle through the springs, as distinguished from transmitted to the frame of the vehicle through the housing tube 4 or its equivalent.

The flange or disc 13, the barrel 8, and the spring pad 12 form a single unitary structure which may be detached from the housing tube in its entirety and as a unit by rotating said structure through an angle of approximately 90 degrees, during which the lug 11 is moved out of line with the key 9, and then moving said structure longitudinally of the housing tube. This feature of construction provides a brake mechanism in which all the elements which accomplish the braking action other than the brake drum may be assembled separately, and then placed as a unit upon the rear housing; and provides a plan whereby a vehicle of standard construction may be equipped with brake mechanisms of different capacities to suit the needs of the owner, as unitary assembled standard sizes of barrels with spring pads thereupon, but having supporting flanges of different diameters and brake bands or shoes of different braking capacities, may be placed upon standard sizes of axle tubes or housings; thus enabling any particular vehicle, either initially or after it has been in use, to be equipped with brake mechanism suitable for the service in which it is to be used or suitable for the vicinity in which it is to operate; the proper diameter of brake drum being chosen for use with any particular size of braking mechanism as will be appreciated.

Finally it will be appreciated that while the flange or disc 13 is herein referred to as an element separate from the barrel 8, these elements may and in fact commonly are made integral with one another; thereby providing a brake mechanism in which the spring pad or its equivalent, the barrel 8 which is in direct engagement with the housing tube, and the flange or disc which supports the brake shoes of their equivalent, are formed as a single integral element or member.

Lubricating material may be supplied to the roller bearing 28 through a passage 29 extending through the sleeve or barrel 8 and communicating with a hole in the wall of the housing tube 4, and the lubricant thus supplied will also enter the joint between the periphery of the axle housing and the interior of the sleeve; thus providing lubrication for such slight relative movement as may occur between the tube and the sleeve when the vehicle is in use, as well also as serving to prevent the rusting of the sleeve and housing together or the sticking of the sleeve upon the housing in such a manner as to perhaps interfere with the removal of the brake mechanism as a whole should it become necesary to do so.

Having thus described and explained my invention, I claim and desire to secure by Letters Patent:

1. In a brake mechanism of the class described the combination with a rear axle housing along which a drive shaft extends, a wheel with which said shaft is operatively connected, a bearing located inside said housing adjacent the outer end thereof and whereby the outer end of said axle is supported, and a brake drum carried by and rotating with said wheel; of a unitary member rotatable relative to and detachably secured to said axle housing and from which the frame of the vehicle may be supported, said member also serving as a support for elements which cooperate with said brake drum to retard the motion of the vehicle.

2. In a brake mechanism of the class described the combination with a rear axle housing through which a drive shaft extends, a wheel driven by said shaft, a bearing located inside said housing adjacent the outer end thereof and whereby the outer end of said axle is supported, and a brake drum secured to and rotating with said wheel; of a unitary spring and brake supporting member angularly movable upon and detachably secured to said axle housing and having a portion adapted to support braking elements which cooperate with said brake drum to retard the motion of the vehicle, and a portion adapted to support a spring whereby the body of the vehicle is carried.

3. In a brake mechanism of the class described the combination with a rear axle housing through which a drive shaft extends, a wheel driven by said axle, and a brake drum secured to and rotating with said wheel; of a barrel surrounding said housing; means located at the inner end of said barrel for detachably securing said barrel in place upon said housing; a spring supporting member carried by said barrel; and a flange carried by said barrel and adapted to support braking elements which cooperate with said brake drum to retard the motion of the vehicle.

4. In a brake mechanism of the class described the combination with a rear axle housing through which a drive shaft extends, a wheel driven by said shaft, a bearing located inside said housing adjacent the outer end thereof and whereby the outer end of said axle is supported, and a brake drum secured to and rotating with said wheel; of a barrel surrounding said housing and capable of angular and sliding movement thereupon; means located at the inner end of said barrel for detachably securing said barrel in place upon said housing; a flange carried by said barrel; a brake band secured to said flange; and means for forcing said brake band into engagement with said brake drum to thereby retard the motion of the vehicle.

5. In a brake mechanism of the class described the combination with a rear axle housing through which a drive shaft extends, a wheel driven by said shaft, and a brake drum secured to and rotating with said wheel; of a barrel surrounding said housing and rotatable thereupon; means for detachably securing said barrel in place upon said housing; a flange carried by said barrel; a brake band carried by said flange; and brake applying mechanism carried by said flange and adapted to force said brake band into engagement with said brake drum to thereby retard the motion of the vehicle, the external diameter of said housing being uniform and corresponding with the interior diameter of said barrel from the extremity of said housing inward and throughout the length of said barrel.

6. In a brake mechanism of the class described the combination with a rear axle housing circular in cross section and through which a driving shaft extends, a wheel driven by said shaft, and a brake drum secured to and rotating with said wheel; of a barrel having an opening circular in cross section supported upon and rotatable relative to said housing; a spring supporting member carried by said barrel; a flange carried by said barrel and adapted to support braking elements which cooperate with said brake drum to retard the motion of the vehicle; and two detachable fastening members carried one by said barrel and the other by said housing, and which members are adapted to be engaged with and disengaged from one another by imparting angular movement to said housing.

7. In a brake mechanism of the class described the combination with a rear axle housing circular in cross section and through which a driving shaft extends, a wheel driven by said shaft, and a brake drum secured to and rotating with said wheel; of a barrel having an opening circular in cross section supported upon and rotatable relative to said housing; a spring supporting pad carried by said barrel; a flange carried by said barrel and adapted to support braking elements which cooperate with said brake drum to retard the motion of the vehicle; a key carried by said housing and against which the inner end of said barrel abuts; and a lug carried by said barrel and adapted to engage said key; the length of said key and lug measured circumferentially of the axle housing being such that said members may be disengaged from one another by imparting rotary movement to said barrel.

In testimony whereof I affix my signature.

JOHN W. WHITE.